United States Patent
Desai

(10) Patent No.: US 7,996,619 B2
(45) Date of Patent: Aug. 9, 2011

(54) K-WAY DIRECT MAPPED CACHE

(75) Inventor: Kiran R. Desai, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 366 days.

(21) Appl. No.: 10/831,488

(22) Filed: Apr. 22, 2004

(65) Prior Publication Data

US 2005/0240715 A1 Oct. 27, 2005

(51) Int. Cl.
*G06F 12/00* (2006.01)
(52) U.S. Cl. .............................. 711/128; 711/3; 365/49.1
(58) Field of Classification Search .............. 711/3, 128, 711/202; 365/49.1
See application file for complete search history.

(56) References Cited

U.S. PATENT DOCUMENTS

| | | | | |
|---|---|---|---|---|
| 5,257,361 A * | 10/1993 | Doi et al. | ....................... | 711/207 |
| 5,765,199 A * | 6/1998 | Chang et al. | ................... | 711/168 |
| 5,913,222 A * | 6/1999 | Liedtke | .............................. | 711/3 |
| 6,321,297 B1 * | 11/2001 | Shamanna et al. | ............ | 711/122 |
| 6,516,386 B1 * | 2/2003 | Pang et al. | ..................... | 711/118 |
| 6,751,720 B2 * | 6/2004 | Barroso et al. | ................. | 711/210 |
| 2001/0026465 A1 * | 10/2001 | Choi et al. | ....................... | 365/49 |

OTHER PUBLICATIONS

Microsoft Computer Dictionary, 2002, Fifth Edition, p. 304.*
Lee, Yongjoon et al., "Pseudo 3-way Set-Associative Cache: A Way of Reducing Miss Ratio with Fast Access Time," IEEE, 1999, pp. 391-396.
Petrov, Peter and Orailoglu, Alex, "Towards Effective Embedded Processors in Codesigns: Customizable Partitioned Caches," ACM (2001), pp. 79-84.
Yang, Qing and Liping, Wu Yang, "A Novel Cache Design for Vector Processing," ACM (1992), pp. 362-371.
Chen, Hsin-Chuan and Chiang, Jen-Shiun, "Design of an Adjustable-Way Set-Associative Cache," IEEE (2001), pp. 315-318.
Batson, Brannon and Vijaykumar, T.N., "Reactive-Associative Caches," IEEE (2001), pp. 49-60.
Calder, Brad, et al., "Predictive Sequential Associative Cache," IEEE (1996), pp. 244-253.

* cited by examiner

*Primary Examiner* — Matthew Bradley
(74) *Attorney, Agent, or Firm* — Trop, Pruner & Hu, P.C.

(57) ABSTRACT

A method and apparatus for a k-way direct mapped cache organization is herein described. Control logic coupled to a cache may associate an address to a way within a plurality based on a first portion of the address. The control logic may match the first portion of the address to a predefined value in a mapping table, wherein the predefined value in the mapping table is associated with the way. In addition, the control logic may map the address to a set within cache based on a second portion of the address.

24 Claims, 6 Drawing Sheets

K-WAY DIRECT MAPPED CACHE

FIELD

This invention relates to the field of cache memories and, in particular, to cache organization.

BACKGROUND

Providing design flexibility in caches by allowing a variety of size choices for the cache, while maintaining the speed of the cache in locating/storing a requested element, may be highly advantageous for architectures that utilize a cache. Traditionally, there have been three types of cache organizations that have been used: the fully associative, the k-way set associative; and the direct mapped cache organizations.

In a fully associative cache organization, each item of information from a main system memory is stored as a unique cache entry. There is usually no relationship between the location of the information in the cache and its original location in main system memory. Therefore, since each storage location can hold information from any location in main system memory, complex and expensive cache comparison logic is required to map the complete main system memory space. Furthermore, whenever a processor makes a memory request, each entry in a fully associative cache must be checked to see if the requested information is present (a hit), which forces a fully associative cache to stay extremely small as to not induce extremely large wait states in processing cycles.

The k-way set associative caches allow larger caches to be designed for a lower cost than fully associative caches, because less expensive and complex comparison logic is needed. Typically, a set associative cache divides the cache memory into k banks of memory, which is also known as k ways. To give a simplified example, if a 128 KB set associative cache has 4 ways, then each way may be 32 KB in size. Usually, a set associative cache sees memory as logically broken up into pages, which may be the size of each way. Continuing the example from above, a 256 KB main system memory may be logically viewed by the cache as 8 pages, each having a size of 32 KB.

Every location within a page of memory (such as the first location) may only be stored in the first location of each of the k ways. Therefore, in the example above, the first memory location in all 8 pages may be stored in only the first entry of any of the 4 ways. When a memory request is made, the set associative cache will compare the memory request with only the cache location the memory request would be stored at, in all of the ways. Since, the set associative cache need only compare the single location within each of the ways, the lookup times for memory requests are much quicker. These faster lookup times allow for larger set associative caches to be designed. However, the ability to compare locations in multiple ways still requires complex and expensive comparison logic.

One variation of the set associative cache that reduce the complexity and cost of the comparison logic is a direct mapped cache, which is effectively a one way set associative cache. Similar to the set associative cache, the direct mapped cache may view memory as broken into pages the size of the single way. From the example above, a 128 KB cache may have a single 128 KB way and may logically view a 256 KB memory as broken into two pages of 128 KB.

Yet, direct mapped caches may posses two major problems. First, when a program accesses two locations in memory, both at the same location in separate logically viewed pages, the direct mapped cache may have to update that location with every memory request (also known as thrashing). Thrashing eliminates any benefit of having a cache. Second, a direct mapped cache may be limited to a multiple of a power of two in design, since it contains only 1 way of $2^s$ sets. As an example, if a processor has room on the die for a six megabyte (6 M) cache and a direct mapped organization is used, only a 4 M cache may be implemented. In contrast, a set associative cache organization may utilize all 6 M room for cache, because it divides the cache memory into k ways, each way having $2^s$ sets (size of the cache=$k*2^s$ sets).

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific numbers of bits in an address, numbers of ways in a cache, placement of a cache, etc. in order to provide a thorough understanding of the present invention. It will be apparent, however, to one skilled in the art that these specific details need not be employed to practice the present invention. In other instances, well known components or methods have not been described in detail in order to avoid unnecessarily obscuring the present invention.

Figure 1:
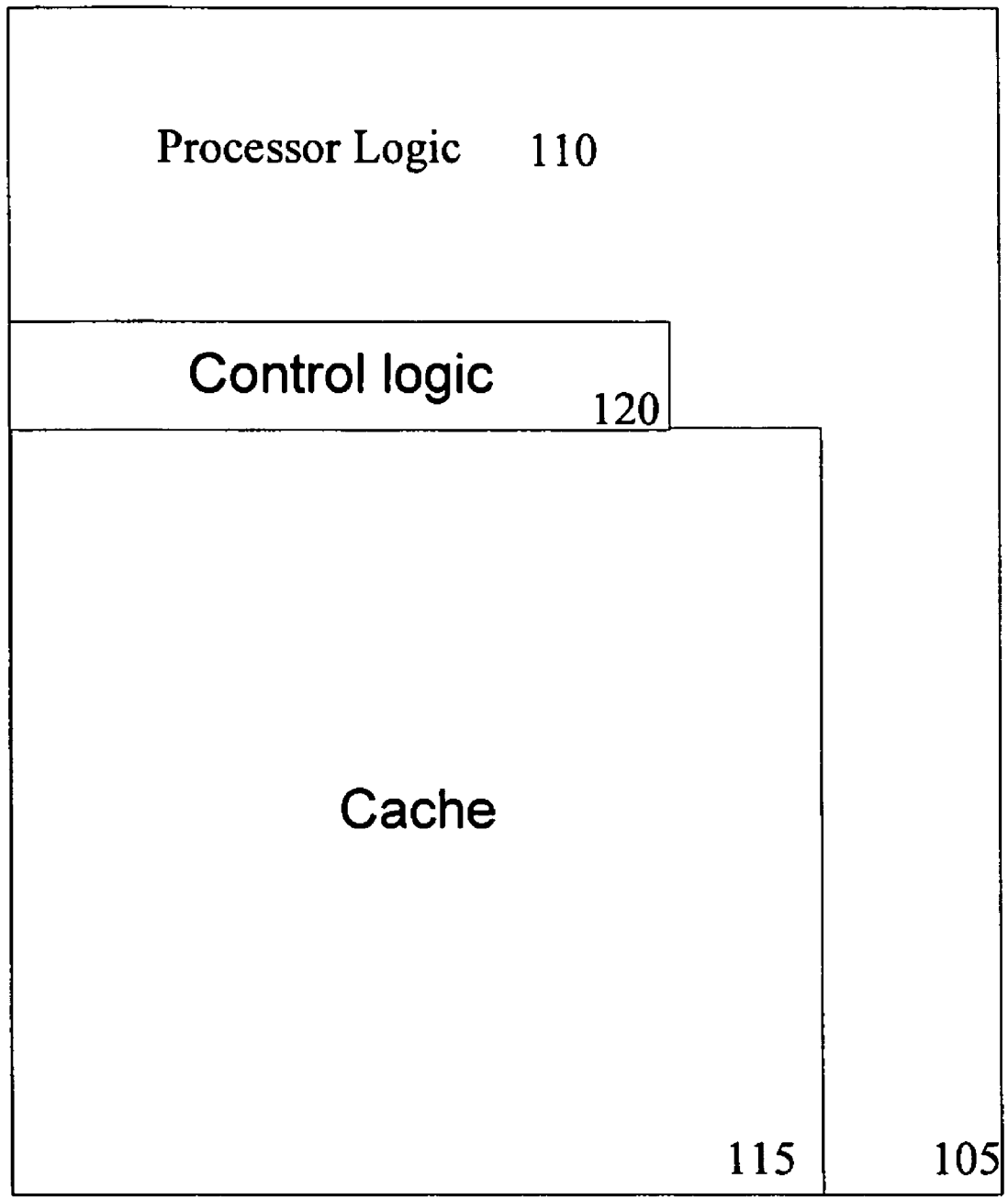
FIG. 1 illustrates an embodiment of a processor having an integrated cache.

FIG. 1 illustrates a microprocessor 105 having processor logic 110, control logic 120, and a cache 115. Microprocessor 105 may be a host processor capable of operating independently from another processor, a host processor operating in a multiprocessor system, a microcontroller, or a coprocessor. Processor logic 110 may be any variety of transistors, circuits, and logic for processing data and/or instructions. As an example, processor logic 110 may include any one, any plurality, or any combination of the following: a data path, an instruction path, a virtual memory addressing unit, an arithmetic logic unit (ALU), a floating point calculation unit, a fixed point calculation unit, a register, a bus controller, a bus interface, and any other logic that may be commonly associated with a processor.

As stated above, microprocessor 105 may also have control logic 120 and cache 115. Although, FIG. 1 illustrates control logic 120 and cache 115 integrated with microprocessor 105, control logic 120 and cache 115 may be located away from microprocessor 105 and merely associated with microprocessor 105. Furthermore, cache 115 and control logic 120 may be located on the microprocessor's die. Control logic 120 may comprise any logic that performs the lookups, the comparisons, the requesting, and/or the storing of addresses, data, instructions, or locations for cache 115. Control logic 120 may be separate from processor logic 110 and cache 115 but coupled to both, present in processor logic 110, or present in cache 115. Control logic 120 will be discussed in more detail in reference to FIGS. 5a and 5b.

Figure 2:
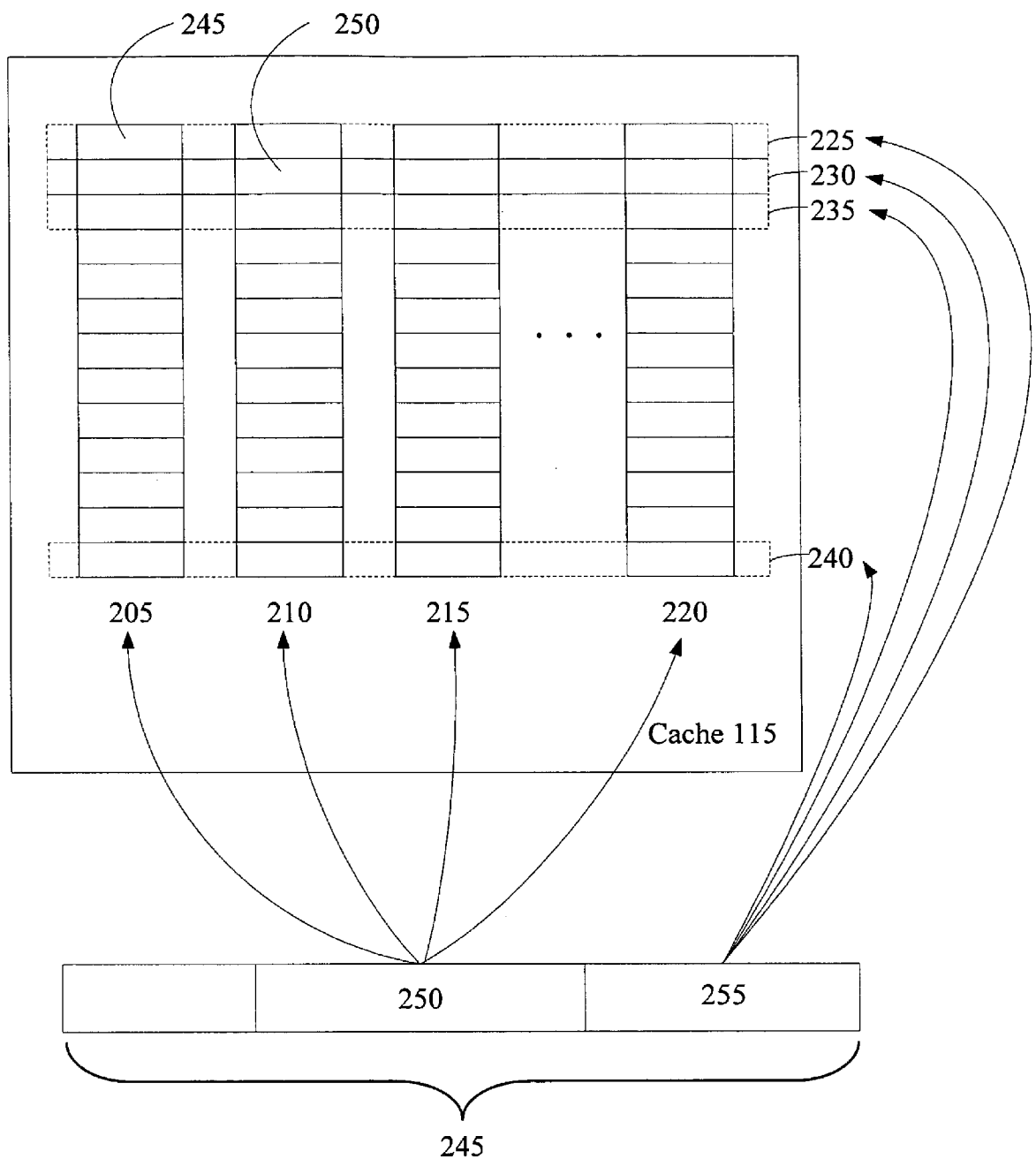
FIG. 2 illustrates an embodiment of a cache organized into k ways and an address with at least a first and second portion

Cache 115 may be any memory, memory array, or any other storing structure commonly used for caching data or instructions. Referring to FIG. 2, a more detailed illustration of how cache 115 may be organized is shown. Cache 115 may be organized into a plurality of ways/blocks (k ways/blocks). In FIG. 2, way 205 (way 0), way 210 (way 1), way 215 (way 2), and way 220 (way k) are depicted. It is readily apparent that any number of ways may be present in cache 115. For example, cache 115 may have 2, 3, 4, 19, or any other number of ways. Within each way, locations that have the same offset within their respective ways may form a group called a set, such as sets 225, 230, 235, and 240. As an illustrative example, each way, such as way 205, may have $2^s$ sets.

An address 245 is also illustrated in FIG. 2, comprising a first predetermined portion 250 and a second predetermined portion 255. As an illustrative example, address 245 may be associated with or reference a location within memory. First predetermined portion 250 and second predetermined portion 255 may comprise any number of bits or value. Although, first predetermined portion 250 and second predetermined portion 255 are depicted as separate portions in the figures, first predetermined portion 250 and second predetermined portion 255 may be the same portion of address 245. Additionally, first and second predetermined portions may be any portion of address 245 and is not limited to including the most-significant bit (MSB) and least-significant bit (LSB). Address 245, first predetermined portion 250, and second predetermined portion 255 will be discussed in more detail in reference to FIGS. 4, 5a, and 5b.

Figure 3:
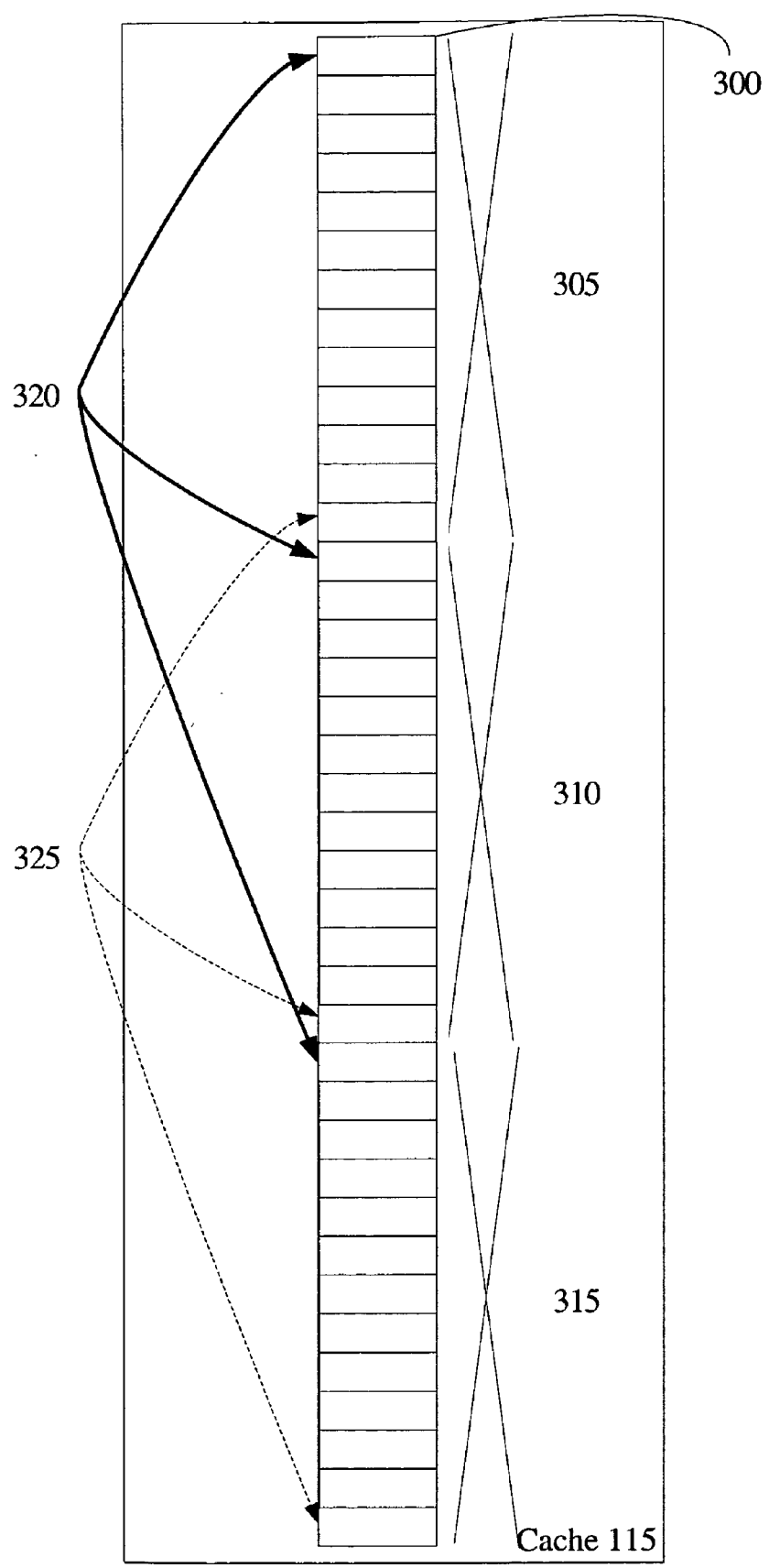
FIG. 3 illustrates one manner that contiguous memory may be organized into ways.

Turning to FIG. 3, an example of how cache 115 may be structured is illustrated. Array 300 may be broken into 3 blocks/ways, such as block 305, 310, and 315. Each element of the same offset within each block may be grouped together to form a set, such as sets 320 and 325. Set 320 contains the first elements of block 305, 310, and 315, while set 325 contains the 13$^{th}$ elements of each block. In various embodiments, there may be any number of ways and any number of sets. In addition, cache 115 is not limited to a one dimensional array, such as array 300. Cache 115 may have a multidimensional array, which represents ways and sets. For example, cache 115 may be a two-dimensional array, wherein the columns of the array are the blocks/ways and the rows of the array are the sets. Inversely, the columns may be the sets and the rows may be the blocks/ways.

Figure 4:
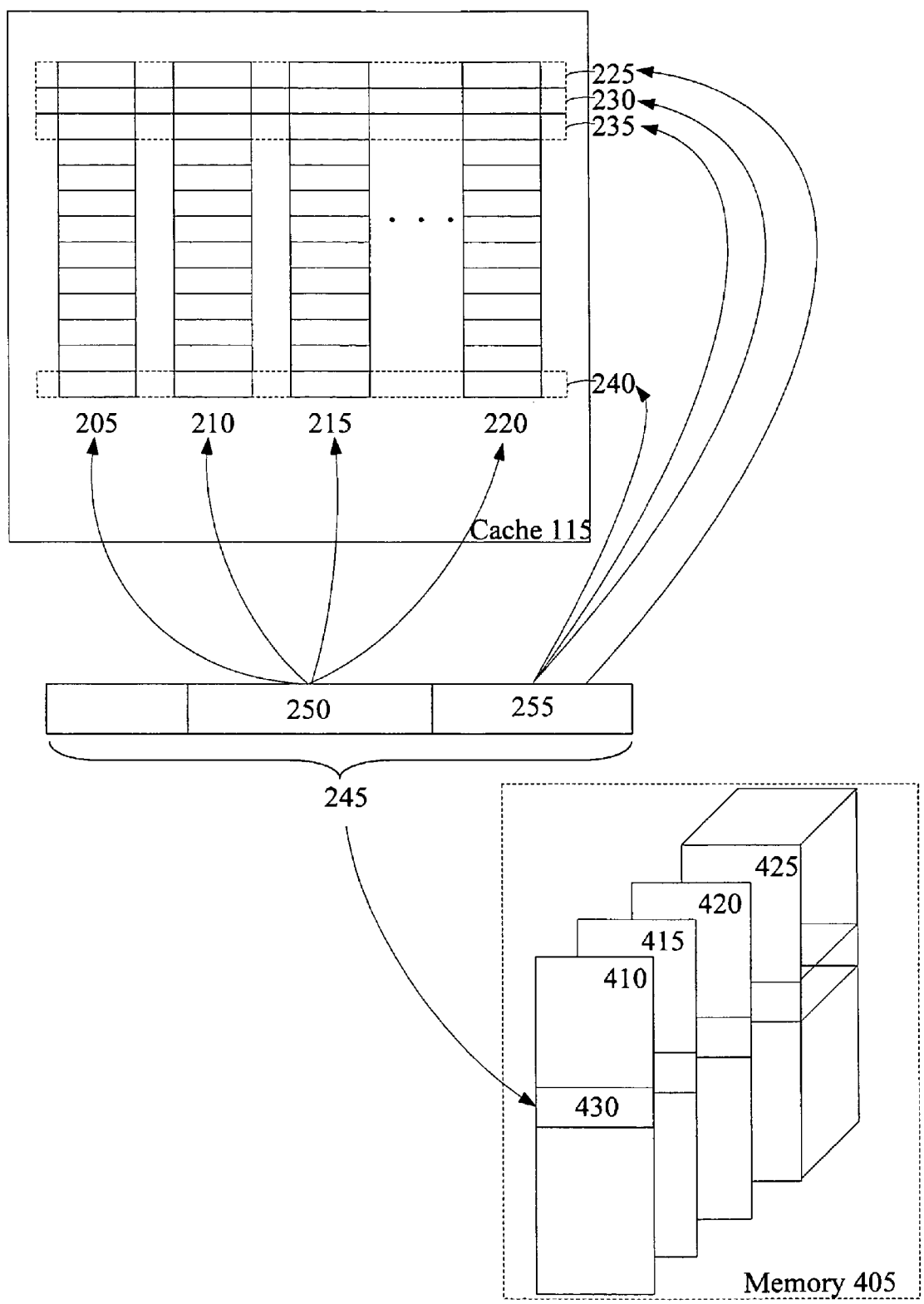
FIG. 4 illustrates one embodiment of a cache organization and address from FIG. 2 in which a memory space is logically broken up into pages.

Referring to FIG. 4, a memory 405 is depicted. Memory 405 may have any number of memory locations, such as location 430. Physically, memory 405 may be laid out in any manner. However, cache 115 may logically view memory 405 as broken up into pages, such as pages 410, 415, 420, and 425. In addition, the size of pages 410-425 may be the size of ways 205, 210, 215, or 220. As an illustrative example, cache 115 may have a size of 128 KB and be split into 4 ways each having the size of 32 KB. If memory 405 has a size of 256 KB, then memory 405 may be logically viewed by cache 115 as having 8 pages of 32 KB each. The memory may be logically broken into any size pages or not broken into pages at all.

Location 430 may store any element, data element, instruction, operand, data operand, or any other item commonly stored in a memory location. Every memory location, such as location 430, may be referenced by an address, such as address 245. Control logic 120, shown in FIG. 2, may map/associate location 430 to a way, such as way 205, way 210, way 215, or way 220, based on first predetermined portion 250 of address 245. First predetermined portion 250, may reference one page, such as page 410, two pages such as pages 410 and 415, or any plurality of pages.

As an illustrative example, if first predetermined portion 250 represents only page 410, and control logic 120 directly mapped the value of first predetermined portion 250 to way 205, then all of the locations within page 410 are placed in way 205. Therefore, if a request for an element within location 430 were issued, control logic 120 may only have to check way 205 to see if the element is present. As another example, if the value of first predetermined portion 250 references a plurality of pages and that value was directly associated with way 205, then all of the lookups for those locations and the storing of those locations may be limited to way 205. First predetermined portion 250 may also reference a certain offset within pages (a set), instead of a number of pages. An illustrative method for mapping a location to a way will be discussed in more detail in reference to FIGS. 5a and 5b.

FIG. 4 also illustrates a second predetermined portion 255 within address 245. Second portion 255 may associate/map location 430 with a set, such as set 225, 230, 235, and 240. Location 430 may be associated/mapped to a set based on second portion 255 by any known method. Second portion 255 may be either fully or partially overlapping with respect to the first portion 250, so that first portion 250 and second portion 255 may even be the same portion. As an illustrative example, if the value within first portion 250 directly maps location 430 to way 205 and the value within second portion 255 directly associates location 430 with set 225, then an integrated first and second portion may be decoded to directly associate location 430 with both way 205 and set 225.

Figure 5A:
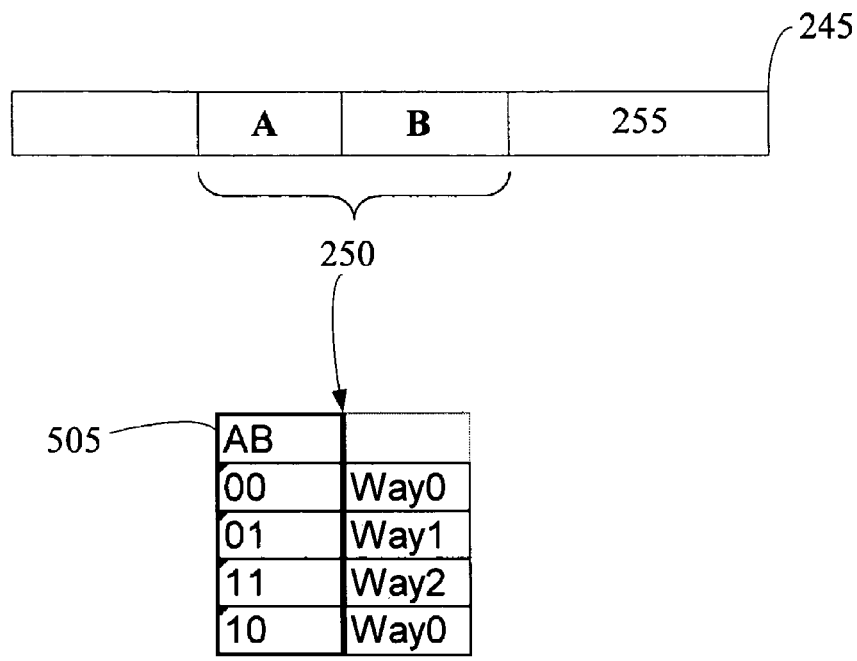
FIG. 5a illustrates the address from FIG. 2 and a mapping table for two bits in the first portion of the address from FIG. 2, to map the two bits to three ways according to one embodiment.
Figure 5B:
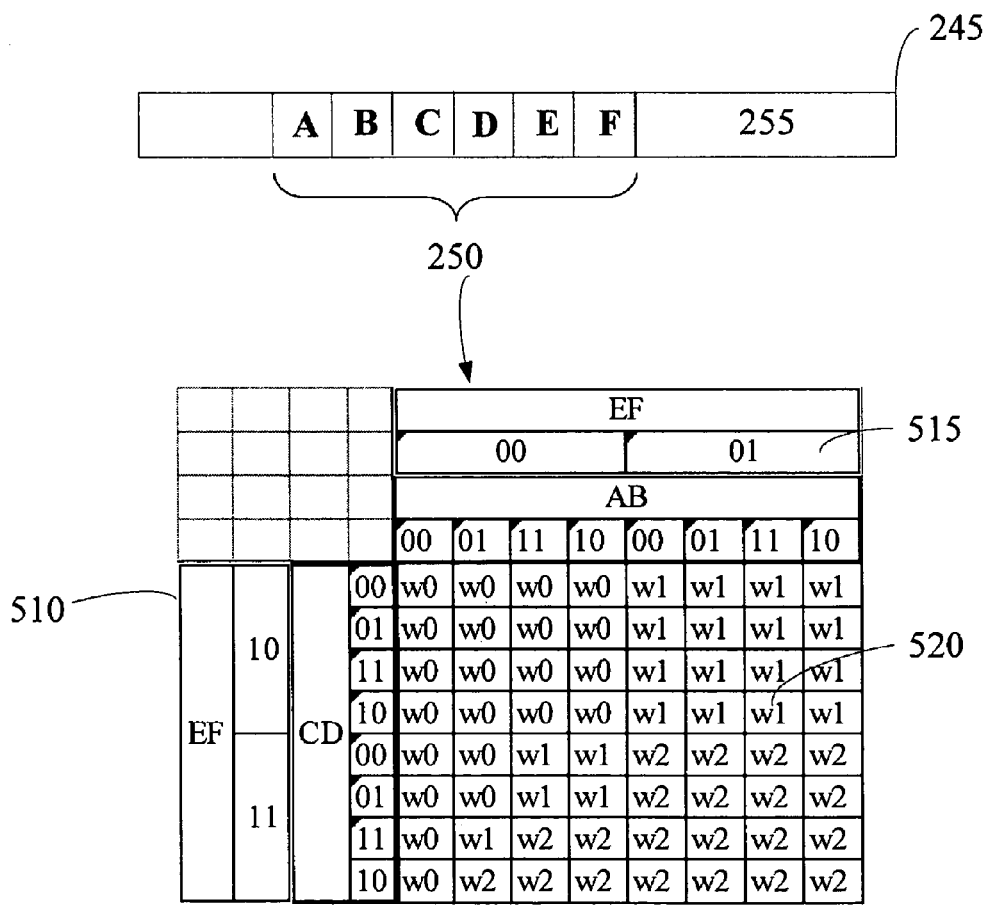
FIG. 5b illustrates the address from FIG. 2 and a mapping table for six bits in the first portion of the address from FIG. 2, to map the six bits to three ways according to one embodiment.

Turning to FIGS. 5a and 5b, an example of how control logic 120, shown in FIG. 1, may map/associate a location with a way based on a first portion 250 is illustrated. Other known or otherwise available mapping techniques may be used to associate bits/values in an address to a location within a cache. FIGS. 5a and 5b depict mapping tables to directly associate/map a location to a single way based on the value (the bits) within first portion 250. Mapping tables 505 and 510 may be implemented within control logic 120, shown in FIG. 1, using any commonly known logic to implement mapping techniques. Directly mapping a location to a way and a set based on a first and second portion of an address eliminates the wasted time and expensive logic required for tag lookups, because the way and set are determined directly from the address.

In FIG. 5a, first portion 250 may have two bits (A and B). Table 505 illustrates that the value of bits A and B directly associate address 245, which references location 430, to a way. For example, if bits A and B have the value 01, control logic 120, shown in FIG. 1, associates location 430 (the location address 245 references) with way 1. In addition, control logic 120 may associate location 430 with a set, such as set 230, shown in FIG. 4, based on second portion 255. Therefore, if there is a request for location 430 or address 245 that references location 430, control logic 120 may only need to check way 1 and set 230 (line 250). This lookup and/or storing of location 430 within a cache may eliminate the lengthy tag lookup normally associated with caches and may also reduce the expensive logic required to complete complex cache lookups.

FIG. 5b illustrates first portion 250 having 6 bits (A-F). Table 510 illustrates that the value of bits A-F directly map address 245, which is associated with location 430, to a way. For example, if bits EF are equal to 01 (in cell 515), then control logic 120, shown in FIG. 1, associates location 430 (the location address 245 references) with either way 1 or way 2. Then if bits ABCD are equal to 1110 (cell 520), then control logic 120, shown in FIG. 1, associates location 430 (the location address 245 references) with way 1. Therefore, when a request from a load or a store in cache occurs, control logic 120 may determine which way to check if the element is present or which way to store the element in based on a matching of a predefined value, such as cell 520 (ABCDEF=111001). Once again the placement of location 430 within cache 115, shown in FIG. 1, is determined directly from address 245 reducing the need for complex logic and lengthy lookup times.

Figure 6:
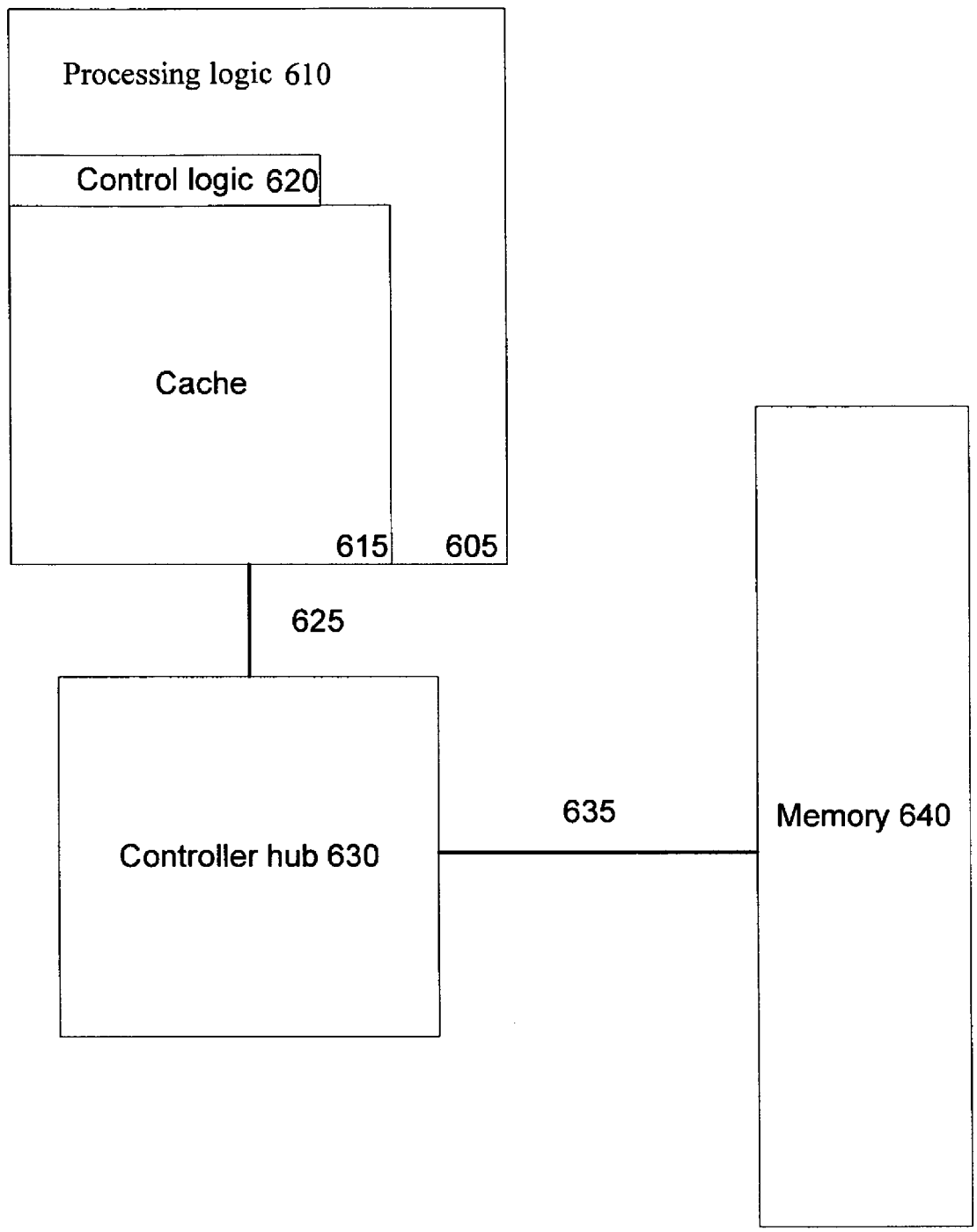
FIG. 6 illustrates a processor having an integrated cache coupled to a controller hub, wherein the controller hub is coupled to a memory.

Referring to FIG. 6, a system 600 is shown having microprocessor 605 coupled to control logic 620, cache 615, and controller hub 630. Controller hub 630 is also coupled to memory 640 by bus 635. Control logic 620 and cache 615 may be integrated with microprocessor 605, present on microprocessor 605's die, located away from microprocessor 605 and merely associated with microprocessor 605, located on controller hub 630, and/or placed anywhere else in the system. In addition, microprocessor 605 may be a host processor, a co-processor, or any other microprocessor for processing data and/or instructions.

As noted above, a k-way direct mapped cache offers the ability to design a cache to any size ($k*2^s$), such as in the set associative caches; however, the k-way direct mapped cache is able to avoid both the power of 2 limitation on traditional direct mapped caches and the expensive/complex lookup circuitry of a fully associative cache.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus comprising:
a microprocessor to generate a memory request referencing an address;
a memory array associated with the microprocessor logically organized into a plurality of sets and a plurality of ways; and
control logic to directly map a first portion of the address to a single way within the plurality of ways and a second portion of the address to a single set within the plurality of sets in response to the control logic receiving the memory request and by matching of the first portion to a cell of a mapping table of the control logic, the mapping table including a plurality of cells each to store a way value, wherein the mapping table is to associate a first part of the first portion of the address to a subset of the plurality ways, and to associate a second part of the first portion to a single way of the subset of ways, without a tag lookup.

2. The apparatus of claim 1, wherein the first and second portions are at least partially overlapping.

3. The apparatus of claim 1, wherein the memory array is a cache located on a die with the microprocessor.

4. The apparatus of claim 3, wherein the memory request includes a load request to read from the address, and wherein the control logic is to check only within the single way based on the first portion of the address and the single set based on the second portion to determine if a valid data element associated with the address is currently held in the memory array.

5. The apparatus of claim 3, wherein the memory request includes a store request to write to the address, and wherein the control logic is to determine a cache location to be updated by the store request only within the single way based on the first portion of the address and the single set based on the second portion.

6. The apparatus of claim 1, wherein the first portion of the address comprises a first number of bits that is a greater number of bits that are needed to represent each of the plurality of ways.

7. The apparatus of claim 1, wherein the address references a memory location within a memory coupled to the microprocessor.

8. The apparatus of claim 1, wherein the control logic is to perform a lookup only within the single way and the single set based on the first and second portions of the address.

9. The apparatus of claim 1, wherein the memory array is not associated with a tag array.

10. The apparatus of claim 1, wherein each way of the memory array is a size of a page of a memory coupled to the microprocessor.

11. The apparatus of claim 1, wherein the plurality of cells of the mapping table are arranged in a first dimension and a second dimension, wherein a first segment of the first portion of the address is used to select a group of cells in one of the first and second dimensions, and a second segment of the first portion is used to select a cell of the group of cells.

12. An apparatus comprising:
a memory array comprising a plurality of elements, wherein the elements are addressable as a plurality of blocks, and wherein each element of the same offset within a block is addressable as a member of one of a plurality of sets; and
control logic to directly map a memory address to one of the plurality of blocks determined from a first number of bits in the memory address via matching of the first number of bits to a cell of a mapping table, the mapping table including a plurality of cells each to store a way value and to associate a first part of the first number of bits to a subset of the plurality ways, and to associate a second part of the first number of bits to a single way of the subset of ways, the control logic further to directly map one of the plurality of sets determined from a second number of bits in the memory address, and without a tag lookup.

13. The apparatus of claim 12, wherein the elements are addressable as a multiple of four blocks.

14. The apparatus of claim 13, wherein the control logic is limited to performing memory operations within a subset of blocks and a subset of sets in response to receiving a memory request referencing the memory address.

15. The apparatus of claim 14, wherein the control logic is to directly map a second memory address to a second subset of blocks of the plurality of blocks determined from the first number of bits in the second memory address and to a second subset of sets of the plurality of sets determined from the second number of bits in the second memory address, and wherein the control logic is limited to performing memory operations within the second subset of blocks and the second subset of sets in response to receiving a second memory request referencing the second memory address.

16. The apparatus of claim 12, wherein the memory array is a cache memory of a processor and the memory address references a memory location within a memory coupled to the processor.

17. The apparatus of claim 12, wherein the control logic is to perform a lookup only within the one block and the one set based on the first and second number of bits.

18. The apparatus of claim 17, wherein each way of the memory array is a size of a page of a memory coupled to a processor.

19. The apparatus of claim 12, wherein the memory array is not associated with a tag array.

20. The apparatus of claim 12, wherein the plurality of cells of the mapping table are arranged in a first dimension and a second dimension, wherein the first part of the first number of bits is used to select a group of cells in one of the first and second dimensions, and a second part of the first number of bits is used to select a cell of the group of cells.

21. A method comprising:
    requesting an element from memory with a microprocessor, wherein the element is referenced by an address;
    determining a single one of a plurality of ways within a cache associated with the microprocessor to check if the element is present therein based only on a first portion of the address, including reading the first portion of the address and matching the first portion of the address to a first value in a mapping table, wherein the mapping table associates the first value with one of the plurality of ways within the cache;
    determining a single one of a plurality of sets within the cache to check if the element is present therein based only on a second portion of the address;
    checking if the element is present only within the determined way and determined set in the cache without a tag lookup; and
    providing the element to the microprocessor in response to the element being present within the determined way and set.

22. The method of claim 21, further comprising:
    reading the second portion of the address; and
    matching the second portion of the address to a second value in the mapping table, wherein the mapping table associates the second value with one of the plurality of sets within the cache.

23. The method of claim 21, wherein the first and the second portions of the address are fully overlapping, and one of the plurality of ways and one of the plurality of sets is determined by matching the overlapping portions with a first value in a mapping table, which associates the first value with one of the plurality of ways and one of the plurality of sets within the cache.

24. The method of claim 21, wherein the mapping table includes a plurality of cells arranged in a first dimension and a second dimension, wherein a first segment of the first portion of the address is used to select a group of cells in one of the first and second dimensions, and a second segment of the first portion is used to select a cell of the group of cells corresponding to the determined way.

\* \* \* \* \*